No. 611,670. Patented Oct. 4, 1898.
J. WITTKOWSKI.
RUBBER DAM CLAMP.
(Application filed May 25, 1898.)
(No Model.)
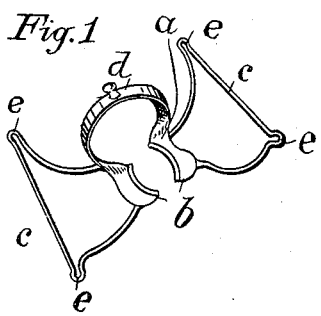
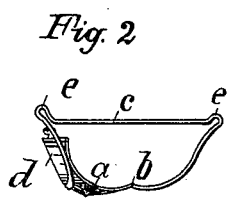
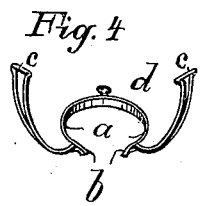
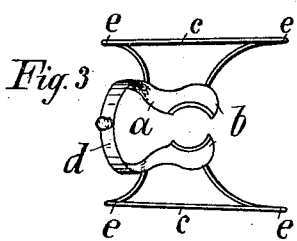
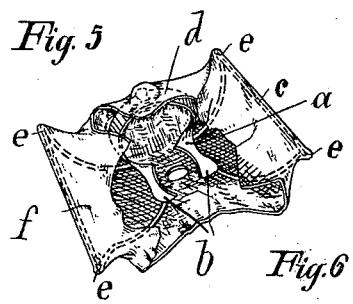
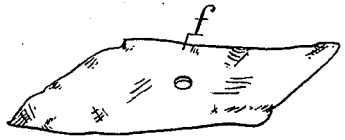
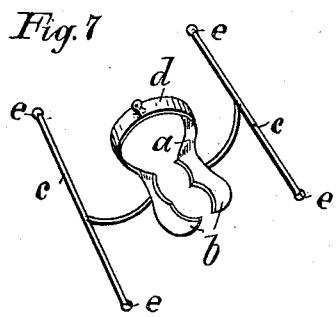
Witnesses:
Inventor:
Joseph Wittkowski
By Richards
his Attorneys

UNITED STATES PATENT OFFICE.

JOSEPH WITTKOWSKI, OF BERLIN, GERMANY.

RUBBER-DAM CLAMP.

SPECIFICATION forming part of Letters Patent No. 611,670, dated October 4, 1898.

Application filed May 25, 1898. Serial No. 681,706. (No model.)

*To all whom it may concern:*

Be it known that I, JOSEPH WITTKOWSKI, dentist, a subject of the German Emperor, residing at 215 Friedrichstrasse, Berlin, Germany, have invented certain new and useful Improvements in Rubber-Dam Clamps, of which the following is a full, clear, and exact specification.

My invention consists in the particular form of clamp hereinafter described and particularly claimed.

Figure 1 shows a perspective view of the clamp; Figs. 2, 3, and 4, respectively, side, plan, and end views of the same; Fig. 5, the clamp with rubber sheet stretched over the frame, and Fig. 6 the rubber sheet itself. Fig. 7 shows a modification of the clamp, to be described.

The clamp $a$, Figs. 1 to 5, on its jaws or cheeks $b$, which embrace the tooth to be stopped, has wings $c\ c$, of wire, bent upward on the same side as the bridge-piece $d$, connecting the jaws. Each wing is provided with two projections formed by bending the wire into the form of eyes, which serve to hold the rubber sheet when stretched over the clamp.

Fig. 5 shows the clamp with rubber sheet stretched over it. A small perforation is first made in this sheet, Fig. 6, to receive the tooth, and it is then simply stretched over the projections $e\ e$, which serve to hold it in position, but permit of its being adjusted, so that the perforation may come precisely over the opening for the tooth between the jaws $b\ b$.

The clamp is adjusted in position in the ordinary manner by means of a pair of pincers. The rubber entirely prevents access of saliva to the tooth, so that the operator can work for hours stopping teeth without being limited in any way as to the choice of the filling material. He has both hands free, since the tooth lies quite exposed, the cheek being effectively held back by the wing $c$. The patient is in no way inconvenienced by the clamp. One special advantage is that the tongue is caused to lie quietly in the mouth, for if the clamp is placed on the lower jaw the tongue is pressed down, or if on the upper jaw the tongue receives a firm support.

The wire is pliant, so that the frame can be bent more or less together in order to fit exactly to the part of the mouth where applied. The wings may also be formed as reflectors in order to illuminate the tooth and the surrounding part.

Fig. 7 shows a modification in the form of the frame. Here instead of being formed of wires bent and fastened to the clamp it is made in one piece with the latter. The jaws are here suitably formed to receive two teeth.

I claim—

A rubber-dam clamp comprising a spring-clamp adapted to clamp the rubber dam to the tooth, arms extending outwardly in substantially opposite directions and wings or members $c$ carried by said arms over which the rubber is adapted to be stretched, said wings or members being adapted to respectively hold back the tongue and cheek, substantially as described.

In witness whereof I have hereunto set my hand in presence of two witnesses.

JOSEPH WITTKOWSKI.

Witnesses:
 H. HEIMAN,
 C. H. DAY.